J. L. R. HAYDEN.
ELECTROLYTIC CELL.
APPLICATION FILED AUG. 20, 1909.
946,040.
Patented Jan. 11, 1910.
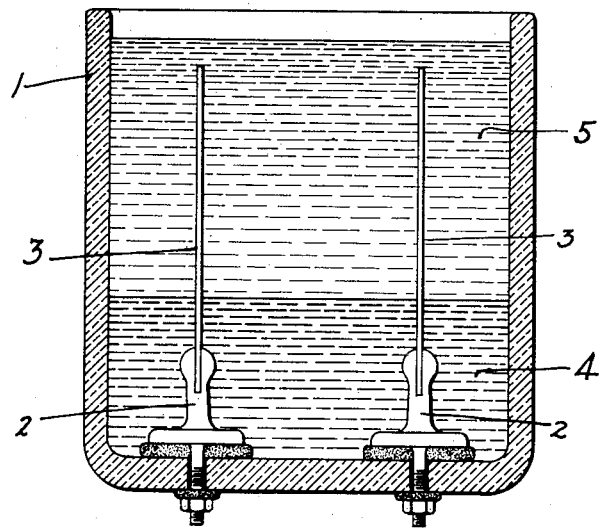
Witnesses:
Lloyd C. Bush
Marcus L. Byng
Inventor:
Joseph L.R. Hayden
by Albert G. Davis
Atty.

UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

ELECTROLYTIC CELL.

946,040.  Specification of Letters Patent.  Patented Jan. 11, 1910.

Application filed August 20, 1909. Serial No. 513,766.

*To all whom it may concern:*

Be it known that I, JOSEPH L. R. HAYDEN, a citizen of the United States, residing at Schenectady, county of Schenectady, State of New York, have invented certain new and useful Improvements in Electrolytic cells, of which the following is a specification.

My invention relates to electrolytic cells and more particularly to electrolytic cells having aluminum electrodes and used in lightning arresters.

Where an electrolytic cell having aluminum electrodes is used as a lightning arrester and particularly where it is directly connected to the line so that there is a continuous flow of current through it, the aluminum electrodes or plates are corroded and gradually eaten away. The corrosive action is especially marked at the surface of the electrolyte and consequently the cell is gradually destroyed. The corrosion of the aluminum electrodes occurs in a very erratic manner and sometimes the electrodes will last a year and again will be eaten through in a few days.

The object of my invention is to provide an electrolytic cell in which the localized corrosion and eating away of the electrodes at the surface of the electrolyte is avoided; which has a longer and more uniform life than the electrolytic cells now commonly used and which is in general an improvement on the prior types of electrolytic cells.

In carrying out my invention, electrodes are not brought through the surface of the electrolyte but are completely submerged therein and connection with the electrodes is made by means of terminals which are placed near the bottom of the vessel which contains the electrolyte and are joined to the electrodes in any suitable way, as by riveting or welding, and the joint between the electrode and the terminal is then covered and protected by means of some heavy liquid, such as carbon tetrachlorid or bromoform, which completely submerges both the terminal and the joint between the electrode and the terminal. The cell may be constructed in various ways, preferably by mounting the terminals directly in the bottom of the cell and mounting the electrodes directly upon the terminals with enough heavy non-conducting liquid in the bottom of the cell to completely submerge the terminals and enough electrolyte above the heavy liquid to completely cover and submerge the electrodes.

My invention will best be understood in connection with the accompanying drawing which is a longitudinal section through a simple form of electrolytic cell embodying my invention and in which the vessel 1 of glass, porcelain, or other suitable material, is provided with metallic terminals 2 of copper, or any other suitable metal, extending through the bottom of the vessel and suitably packed to form a liquid-tight joint with the vessel. Aluminum plates or electrodes 3 are mounted in and electrically connected to the terminals 2 by riveting, soldering, or any other suitable mode of fastening. In the specific construction shown in the drawing, the terminals 2 are slotted and electrodes 3 are set into the slots and firmly held in place therein by rivets, not shown. The vessel 1 contains a body or layer 4 of heavy non-conducting liquid such as carbon tetrachlorid or bromoform, both of which give good results when used for this purpose, the layer or body of non-conducting liquid being deep enough to completely submerge and cover the terminal 2 and the joints between the electrodes 3 and the terminal. Above the heavy liquid 4 is the electrolyte 5 which is lighter than the liquid 4, and does not mix with it, and is deep enough to completely cover the electrodes 3, which preferably end about ½ inch to 1 inch below the surface of the electrolyte. The electrodes 3 therefore project out of the non-conducting heavy liquid 4 into the electrolyte 5, but do not project above the surface of the electrolyte, and as the liquid 4 is heavier than the electrolyte and does not mix with it, the electrolyte and the liquid maintain the relation indicated in the drawing during the normal operation of the cell. With the cell constructed in accordance with my invention, the electrodes wear away uniformly and the corrosion and eating away is not localized at any one point, hence the life of the cell is greatly increased and rendered much more uniform than in the cells heretofore used.

My invention may be embodied in many other forms than that shown and described, and I do not desire to limit myself to the precise arrangement disclosed, but aim in the appended claims to cover all modifications within the spirit and scope of my invention.

What I claim as new and desire to secure by Letters Patent of the United States, is:—

1. An electrolytic cell comprising a vessel containing an electrolyte and a heavy liquid of greater density than the electrolyte, terminals mounted in said vessel in position to be submerged in the heavy liquid, and electrodes electrically connected to said terminals and submerged in the electrolyte.

2. An electrolytic cell comprising a vessel, terminals mounted in said vessel, electrodes electrically joined to said terminals, a heavy non-conducting liquid submerging the joints between said terminals and said electrodes and an electrolyte lighter than said liquid submerging said electrodes.

3. An electrolytic cell comprising a vessel containing an electrolyte and a layer of heavy non-conducting liquid beneath the electrolyte, terminals mounted beneath the surface of the heavy liquid, and electrodes mounted on said terminals to project into the electrolyte and to be submerged therein.

4. An electrolytic cell comprising a vessel containing a layer of heavy non-conducting liquid at the bottom and a body of electrolyte above the heavy liquid, terminals projecting into and submerged by the layer of heavy liquid, and electrodes electrically connected to and mounted on said terminals to project above the heavy liquid into the electrolyte.

In witness whereof, I have hereunto set my hand this 19th day of August, 1909.

JOSEPH L. R. HAYDEN.

Witnesses:
BENJAMIN B. HULL,
THOMAS W. NOONAN.